United States Patent
Madrid et al.

(10) Patent No.: US 7,761,656 B2
(45) Date of Patent: Jul. 20, 2010

(54) DETECTION OF SPECULATIVE PRECHARGE

(75) Inventors: Philip E. Madrid, Austin, TX (US); Tahsin Askar, Round Rock, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 386 days.

(21) Appl. No.: 11/843,443

(22) Filed: Aug. 22, 2007

(65) Prior Publication Data

US 2009/0055570 A1 Feb. 26, 2009

(51) Int. Cl.
*G06F 12/00* (2006.01)
(52) U.S. Cl. ...................................... 711/105
(58) Field of Classification Search ........................ None
See application file for complete search history.

(56) References Cited

U.S. PATENT DOCUMENTS

| | | | |
|---|---|---|---|
| 5,625,790 A | 4/1997 | Cutter | |
| 5,715,421 A * | 2/1998 | Akiyama et al. | 711/213 |
| 5,732,236 A | 3/1998 | Nguyen | |
| 5,845,315 A | 12/1998 | Cutter | |
| 5,983,325 A | 11/1999 | Lewchuk | |
| 6,370,624 B1 * | 4/2002 | Ajanovic et al. | 711/149 |
| 6,401,180 B1 | 6/2002 | Hartmann | |
| 6,829,184 B2 | 12/2004 | Khandekar | |
| 7,124,260 B2 | 10/2006 | LaBerge | |
| 7,127,573 B1 | 10/2006 | Strongin et al. | |
| 7,133,995 B1 | 11/2006 | Isaac | |
| 7,167,385 B2 | 1/2007 | Chan | |
| 7,167,946 B2 | 1/2007 | Osborne | |
| 7,277,996 B2 | 10/2007 | LaBerge | |
| 7,310,273 B2 | 12/2007 | Im et al. | |
| 2001/0013082 A1 * | 8/2001 | Jeddeloh | 711/105 |
| 2003/0061459 A1 * | 3/2003 | Aboulenein et al. | 711/167 |
| 2005/0060533 A1 | 3/2005 | Woo et al. | |
| 2007/0033353 A1 * | 2/2007 | Jeddeloh | 711/154 |
| 2008/0183977 A1 * | 7/2008 | Gower et al. | 711/154 |

OTHER PUBLICATIONS

International Search Report and Written Opinion mailed Nov. 6, 2008 for International Application No. PCT/US2008/009098 filed Jul. 28, 2007.

* cited by examiner

*Primary Examiner*—Jack A Lane
(74) *Attorney, Agent, or Firm*—Meyertons, Hood, Kivlin, Kowert & Goetzel, P.C.

(57) ABSTRACT

A DRAM controller may be configured to re-order read/write requests to maximize the number of page hits and minimize the number of page conflicts and page misses. A three-level prediction algorithm may be performed to obtain auto-precharge prediction for each read/write request, without having to track every individual page. Instead, the DRAM controller may track the history of page activity for each bank of DRAM, and make a prediction to first order based history that is not bank based. The memory requests may be stored in a queue, a specified number at a time, and used to determine whether a page should be closed or left open following access to that page. If no future requests in the queue are to the given bank containing the page, recent bank history for that bank may be used to obtain a prediction whether the page should be closed or left open. If the page is not closed as a result of the determination and/or prediction, it may be left open and closed after it has remained idle a specified length of time following the last access to the page.

30 Claims, 4 Drawing Sheets

DETECTION OF SPECULATIVE PRECHARGE

BACKGROUND OF THE INVENTION

1. Field of the Invention

This invention relates generally to the field of memory systems, and more particularly, to the design of a memory controller.

2. Description of the Related Art

With present-day computer systems becoming increasingly more complex, and advances in technology leading to ever increasing processor speeds, it is becoming more and more difficult to optimize system performance, which oftentimes depends largely on the bandwidth and latency of the given system's memory. Consequently, accessing memory with the lowest latency, and highest use of memory bandwidth may improve and/or optimize the system's performance. As the required time to access the memory and complete a given memory request increases, the system slows down. Thus, any reduction in access time, and/or an overall increase in throughput on the memory bus may benefit system performance.

A large number of systems, including desktop computers, graphics adapter cards and notebook computers among others, use Dynamic random access memory (DRAM). DRAM devices provide many advantages over other memory technologies, including and most notably, static random access memory (SRAM) devices. The most important of these benefits are higher storage densities and less power consumption. However, these benefits come at the expense of various time delays incurred when preparing the memory cells and other components within DRAM devices for each subsequent access, for example before/after each read/write access. Examples of such delays include the time required to perform row precharge, row refresh, and row activation. In order to more precisely manage and control memory operations when incurring these delays, additional commands—which are transmitted between read/write accesses—have been created, resulting in additional overhead. A large percentage of DRAMs in use today belong to the double-data-rate synchronous DRAM (DDR SDRAM) family.

DDR SDRAM (including DDR2 and DDR3) achieves greater bandwidth than single-data-rate SDRAM by transferring data on the rising and falling edges of a strobe signal based on the system the clock. This effectively doubles the transfer rate, thereby improving system performance, without requiring an increase in the frequency of the memory bus. To further increase DRAM performance, the memory elements are oftentimes accessed in page configuration, in which a row of the DRAM may be active, or open (the row address strobe—RAS—signal does not need to remain asserted) while performing multiple reads or writes using separate column address strobe—CAS—signals. This allows successive reads or writes within the same row to avoid the delays usually associated with precharge and row access, and provides a noticeable increase in system performance during burst data transfers.

Typically, a memory page needs to be open before reads from the page or writes to the page can be performed. The DRAM controller may close the page immediately after a read/write command, or may decide to leave the page open. However, the limited capacity of the DRAM controller may preclude it from being able to handle many open pages. As a result, the DRAM controller may be required to close some of the open pages, even if leaving those pages open would eliminate some of the access delays during future transfers. Thus, limitations of the DRAM controller may present an obstacle to taking full advantage of operating a DRAM memory.

Other corresponding issues related to the prior art will become apparent to one skilled in the art after comparing such prior art with the present invention as described herein.

SUMMARY OF THE INVENTION

A system (e.g. a computer system) may include DRAM (Dynamic Random Access Memory) devices coupled to a DRAM bus, and a DRAM controller configured to manage and control access to the DRAM devices. Before a memory page could be accessed for a read or a write operation, the memory page may need to be opened, if it is not already open. The DRAM controller may close an open page immediately following a read/write request that accessed the page, or it may decide to leave the page open. If the DRAM controller has limited capacity to handle many open pages, it may, in some instances, be required to close one or more open pages, even if leaving those pages open would considerably decrease access time to the memory by eliminating the need for additional activate (to open a new page) and precharge (to close an open page) commands. Overall throughput of the DRAM bus may be improved despite the limited capacity of the DRAM controller to handle many open pages at one time. In one set of embodiments the DRAM controller may be configured to operate according to an efficient page policy to decide which open pages to keep open and which open pages to close to minimize activate and precharge commands that may need to be issued between subsequent read/write accesses.

A memory controller, e.g. DRAM controller may be configured to operate according to a 3-level auto-precharge prediction algorithm for improved memory access. The DRAM controller may optimize page usage by tracking the history of page activity for each DRAM bank. The history of recent accesses to a given bank may enable the DRAM controller to decide whether to begin to auto-precharge the row corresponding to the accessed page after read/write operations, or to leave open the accessed page. If the page should be left open, the history of recent accesses to a given bank may also determine how long the page should be left open (and idle) before it is closed. Thus, the DRAM controller may be configured to track the history of page hits (requests made to an already open row in a particular bank of DRAM), page misses (requests made to a row in a particular bank of DRAM that does not have any rows open), and page conflicts (requests made to a row in a particular bank of DRAM that already has another, different row open) on a per bank basis, while making an auto-precharge prediction to first order based history that is not bank based.

In one set of embodiments, the DRAM controller may include a Page Table, in which every entry may record the last four historical accesses to a given memory bank. The DRAM controller may also include a Memory Bank History Table. After a memory request wins arbitration, the DRAM controller may update the Memory Bank History Table with an indication of whether the request was to the same DRAM page in the given memory bank as the previous memory request. This is actually different than an indication of whether the request was a page hit or not, since page misses may very well request a memory page that is the most recently accessed (though now closed) memory page in a given bank.

Prediction may be performed once a request has been selected through arbitration. Upon selection, the Memory Bank History Table may be indexed with the last M accesses (e.g. three accesses) to the bank in question, plus the access just selected. The Memory Bank History Table may be updated the cycle after a prediction has been made. The update may be performed for the value stored at the location indexed by the corresponding (M+1)-bit (e.g. 4-bit, when M is 3) bank history information stored in the DRAM Page Table for the bank in question. In one set of embodiments, the update of the prediction may occur based on a confidence counter. Each Memory Bank History Table entry may include an N-bit (e.g. 2-bit) confidence count value. The DRAM controller may increment the confidence count value (saturating at a maximum value) if the prediction was correct. The DRAM controller may decrement the confidence count value if the prediction was incorrect. The DRAM controller may then update the prediction value only if the counter reaches a specified value, e.g. zero. In alternate embodiments the count value may start low and increment and the maximum value may be used as an indication that the prediction value may be updated. The update of the history, prediction and confidence count value may not be performed for requests whose auto-precharge decision was determined by a Bank Hit or a Bank Conflict, as further described below.

The state of whether other pending requests in the queue are targeted toward a particular DRAM bank may supersede the auto-precharge prediction indicated by the prediction value in the Memory Bank History Table. For example, the prediction value stored in the Memory Bank History Table and corresponding to the current memory request may predict that the current read/write request should be sent to the DRAM memory with auto-precharge enabled. However, the request queue may include one or more pending requests that are targeting the same DRAM page as the current memory request. This may indicate that auto-precharging may not be beneficial in this case.

In one set of embodiments, once a pending memory request has been selected as the current memory request (e.g. as a result of arbitration), resultant Bank Hit and Bank Conflict signals (corresponding to potential page hits and page misses, respectively, within the memory bank in question) may be formed to qualify the bank history prediction. If the DRAM controller determines that none of the pending memory requests would result in either a page hit or a page conflict (i.e. none of the pending memory requests are requesting access to the memory bank in question), the DRAM controller may set the auto-precharge for the current memory request based on the bank history prediction (as described above). If none of the pending memory requests would result in a page hit but at least one of the pending memory requests would result in a page conflict, the auto-precharge may be enabled for the current memory request. If at least one of the pending memory requests would result in a page hit, the auto-precharge may be disabled for the current memory request.

If the read/write request does not auto-precharge, the DRAM controller may use an idle cycle counter to determine if an open page should be closed after having remained idle for a specified length of time. In one embodiment, each entry in the DRAM Page Table may track how long a given open memory page has been open. The DRAM controller may close the open memory page when the idle cycle counter hits a programmable limit. The DRAM controller may close an inactive page after a programmable fixed number of clock cycles, or it may close an inactive page after a fixed number of clock cycles that have been dynamically adjusted based on the DRAM Page Table entry history.

BRIEF DESCRIPTION OF THE DRAWINGS

Other aspects of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

As used herein, "a memory request made to a given memory bank" or "a memory request made to an open/closed memory page" means that the memory request is requesting access to the given memory bank and/or the open/closed memory page. In other words, for example the expression "memory request made to an open page" is equivalent to "memory request requesting access to an open page". Similarly, "a memory request targeting a given bank", or "a memory request targeting an open/closed page" means that the memory request is requesting access to the given memory bank and/or the open/closed memory page.

Figure 1:
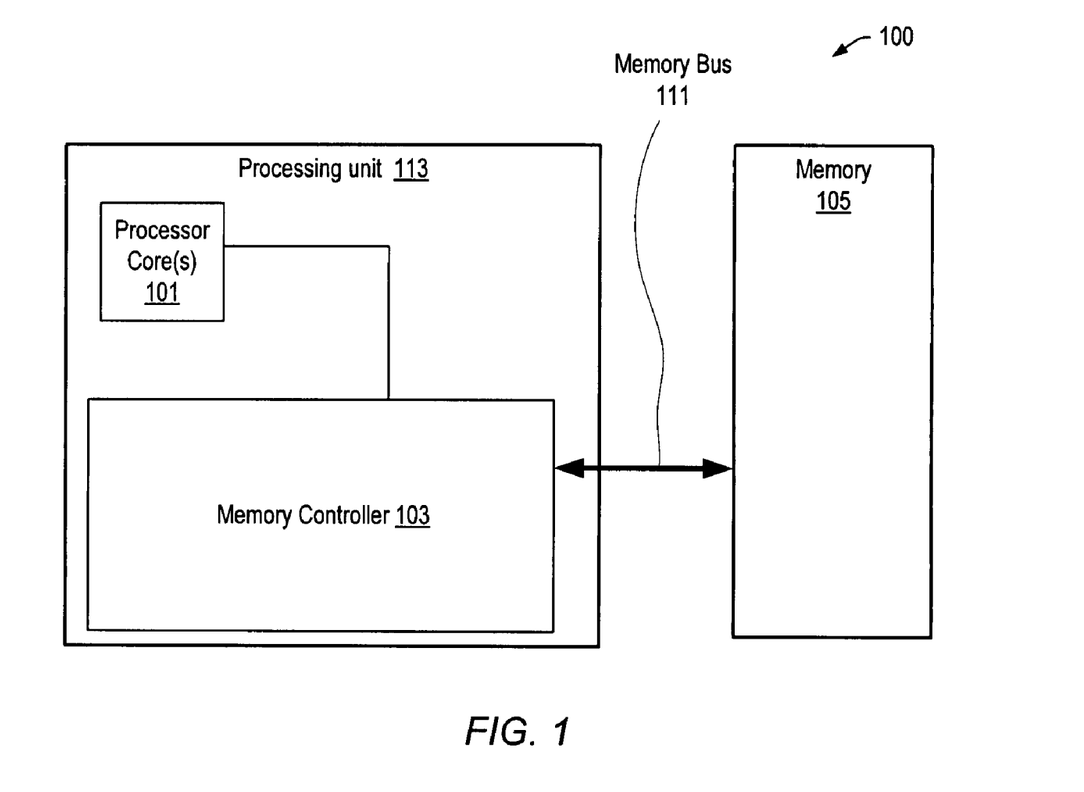
FIG. 1 a block diagram of an exemplary system comprising a memory controller configured to control access to a memory via a memory bus.

FIG. 1 shows a block diagram of a basic exemplary system 100, which may be a computer system, in which a processing unit 100 is configured with a processor core 101, coupled to a memory controller 103. Memory controller 103 may be coupled to a memory bus 111, through which memory controller 103 may regulate access to memory 105 to facilitate data exchange between processing unit 100 and memory 105. Those skilled in the art will appreciate that system 100 may be implemented in a variety of ways, and is shown to illustrate a basic configuration in which memory access is controlled by a memory controller.

In one set of embodiments, memory controller 103 may comprise sub circuits and/or components, including registers for supporting a range of functionality as required by the needs of system 100. For example, memory controller 103 may include various buffers for buffering data being transferred between memory 105 and processor core 101, and may be divided into sub-control blocks. Similarly, memory 105 may include multiple memory elements or memory devices in various configurations, adapted to interface with memory controller 103 via memory bus 111. Various embodiments are possible and are contemplated.

In one set of embodiments, memory 105 may be a DRAM (dynamic random access memory), and memory controller 103 may therefore be a DRAM controller. In yet another set of embodiments memory 105 may comprise a Double Data Rate DRAM (DDR DRAM), e.g. a DDR3 memory, controlled by DDR3 memory controller 103. In one set of embodiments, DRAM controller 103 may be configured to manage and control access to memory pages in DRAM devices. Before a memory page is accessed for a read or a write operation, it may need to be opened. DRAM controller 103 may close an open page following the read/write access, or may decide to leave the page open. In one set of embodiments, DRAM controller 103 is configured to operate according to an efficient page policy designed to reduce activate and precharge commands issued between subsequent read/write accesses, thus improving overall throughput of DRAM bus 111 even when DRAM controller 103 is not capable of simultaneously handling a large(r) number of open pages.

When interfacing with DRAM 105, DRAM controller 103 may be operated to handle read and write requests resulting in three distinct types of memory accesses. The first type of memory access corresponds to requests made to a row in a particular bank of IS DRAM 105 that already has another, different row open, and is commonly referred to as a page conflict. In case of a page conflict, the page is first closed via a precharge command, then opened via an activate command, to prepare DRAM 105 for the requested read/write operation. The second type of memory access corresponds to requests made to a row in a particular bank of DRAM 105 that does not have any rows open, and is commonly referred to as a page miss. In case of a page miss, the page is first opened via an activate command, to prepare DRAM 105 for the requested read/write operation. The third type of memory access corresponds to requests made to a row in a particular bank of DRAM 105 that is already open, and is commonly referred to as a page hit. In case of a page hit, the requested read/write operation may be performed without having to prepare DRAM 105 for the requested read/write operation, and thus, without additional commands having to be performed first.

Therefore, it may be preferable to configure DRAM controller 103 to re-order read/write requests in a way that maximizes the number of page hits and minimizes the number of page conflicts and page activates. Consequently, when the stream of addresses associated with a stream of requests is not conducive to page hits, DRAM controller 103 may be operated to favor page misses as a next better alternative to page conflicts. Accordingly, to achieve optimum performance, DRAM controller 103 may be configured to perform a three-level auto-precharge prediction algorithm.

Figure 2:
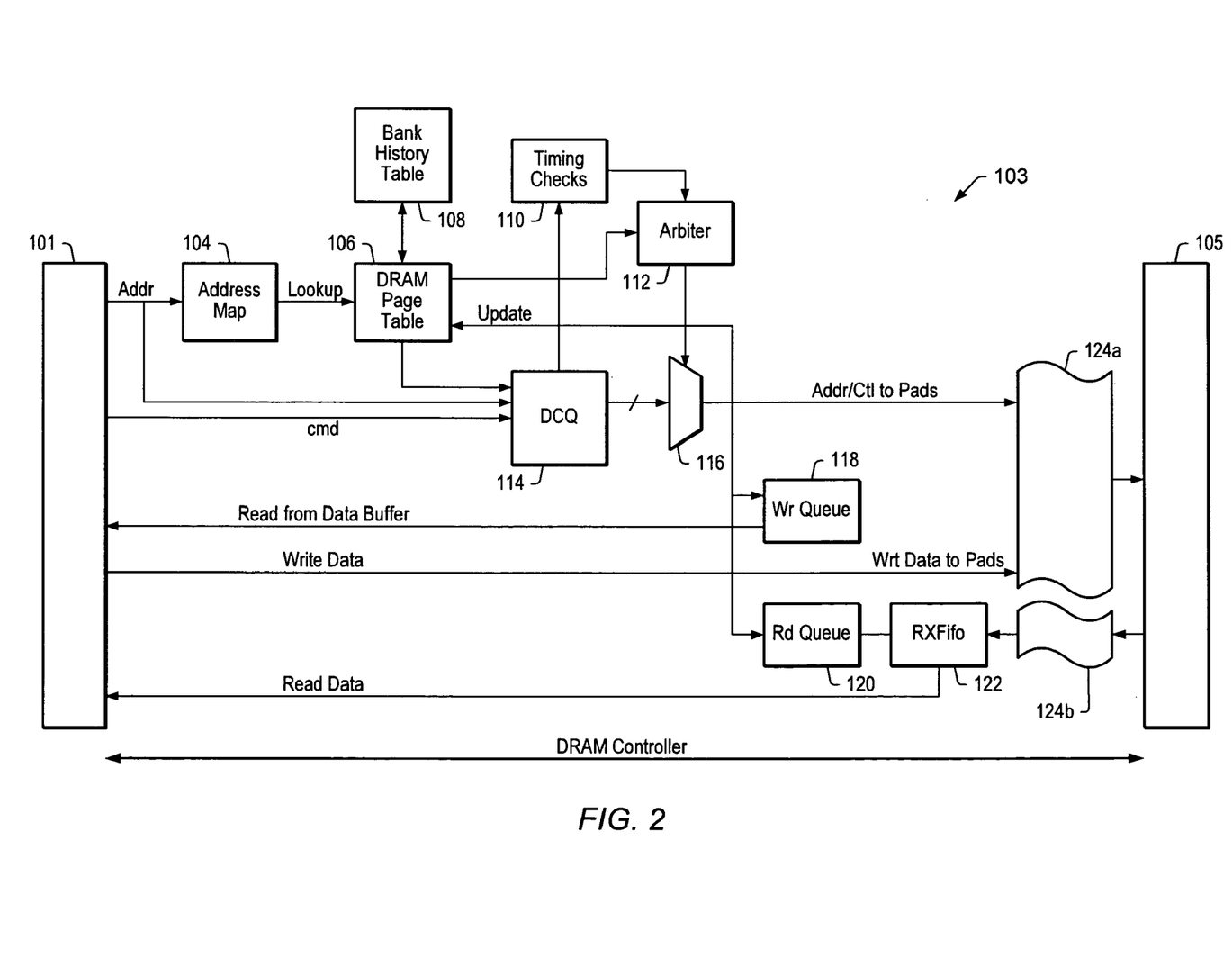
FIG. 2 is a partial logic block diagram of one embodiment of the memory controller of FIG. 1.

FIG. 2 illustrates one possible embodiment of DRAM controller 103 configured to perform a three-level auto-precharge prediction algorithm. In one set of embodiments, DRAM controller 103 may support up to a specified number of open pages (32 open pages in some embodiments) using a DRAM Page Table 106. DRAM Page Table 106 may be indexed based on a chip select signal(s) and bank select signal(s), thus covering every bank, and may be used to store row address and recent bank history information for each bank. DRAM Page Table 106 may also be used to determine whether a read/write request results in a page hit, page miss or page conflict, and whether an auto-precharge should be performed for a current read/write request. Address map 104 may receive an address corresponding to a present read/write request from processor core 101, and may generate the index (lookup) signal to lookup the page corresponding to the present request in DRAM Page Table 106.

Incoming commands may be placed in a DRAM controller request queue (DCQ) 114, which may be configured to hold a specified number of entries (12 entries in some embodiments). DCQ 114 may thus be configured to store reads, writes, and prefetches, as well as DRAM address information, page hit/miss/conflict information, and request priority information corresponding to the read and write requests, and prefetch commands. DCQ 114 may be allocated once the above information has been obtained, and may subsequently be deallocated once the entire command sequence of a request has completed. In addition, DCQ 114 may be updated every time DRAM Page Table 106 changes. Arbitration of the queued commands may be performed by arbiter 112 according to a specified priority scheme and/or according to priorities of various request types, based at least on page information received from DRAM Page Table 106, and timing check information received from timing check block 110. In general, arbitration of the incoming requests may be performed according to one or more of many possible priority schemes, and each priority scheme may be devised according to specific system performance and memory performance needs. For example, older requests may receive priority over more recent requests with an additional mechanism in place to prevent an oldest entry from being bypassed more than a specified number of times. Other possibilities may include selecting page hits over page misses, which may be selected over page conflicts. Those skilled in the art will appreciate that page usage optimization may also play a part in multiple different arbitration schemes, and that various other priority schemes, although not explicitly disclosed herein, are possible and are contemplated. Once a command from DCQ 114 has been selected through arbitration, the selected command, along with its associated address information, may be provided to DRAM 105 via multiplexer 116 through pads 124a.

DRAM controller 105 may also include back end read and write queues 120 and 118, respectively. Write queue 118 may be used to store a specified number (6 in some embodiments) of write data requests after their command portions have completed and DCQ 114 has been deallocated. Write queue 118 may thus facilitate reading data out of the memory controller data buffer in a more precisely timed manner. Read queue 120 may be used to store a specified number (12 in some embodiments) of write data requests after their command portions have completed and DCQ 114 has been deallocated. Read queue 120 may thus facilitate, in case of DDR memories, control of DDR trigger signal DQS and data receivers, and receive FIFO (first-in, first-out) buffer 122 in order to transfer data to the negative clock domain.

Page Usage Optimization Using Auto-Precharge Prediction:

DRAM controller 103 may optimize page usage by tracking the history of page activity for each bank of DRAM 105. The history of recent accesses to any given bank may help in determining whether DRAM controller 103 should begin to auto-precharge following a read/write operation, or leave the memory page open. If it is determined that the page should be left open, the history may also be used to determine how long the page should be left open (and possibly remain idle) before it is closed. In one set of embodiments, the history of every page in DRAM 105 may be tracked. However, in cases when this may not be practical to implement in hardware, DRAM controller 103 may be configured to track the history of page hits, page misses, and page conflicts on a per bank basis (e.g. using DRAM Page Table 106), while making a prediction to first order based history that is not bank based (using Bank History Table 108 in conjunction with DRAM Page Table 106).

Bank History:

As previously mentioned, DRAM controller 103 may track the history of page activity for each DRAM bank of DRAM 105. Every entry in Bank History Table 108 may include a prediction based on the history of the last four page accesses within a given bank (stored in DRAM Page Table 106). After a request wins arbitration from arbiter 112 to become the current request, the bank history may be updated according to whether the current request is to the same DRAM page within the bank as the previous request made for that bank. In other words, since tracking is performed on a per bank basis, this indication is slightly different than an indication of whether the current request is a page hit or not. For example, a current request may result in a page miss, but it may be requesting the same page that was last requested for the currently requested bank, resulting in the current request being considered a "hit" from the perspective of the requested bank in tracking page accesses for the requested bank. To put another way, a page miss may actually indicate that the current request could have been a page hit, had the requested page not been prematurely closed. Had the page not been closed, the current request could have resulted in either a page hit or a page conflict, but not a page miss. It should also be noted that while in the presently described embodiments prefetches and writes would not result in updates to Page History Table 108, alternate embodiments may be configured differently.

Figure 3:
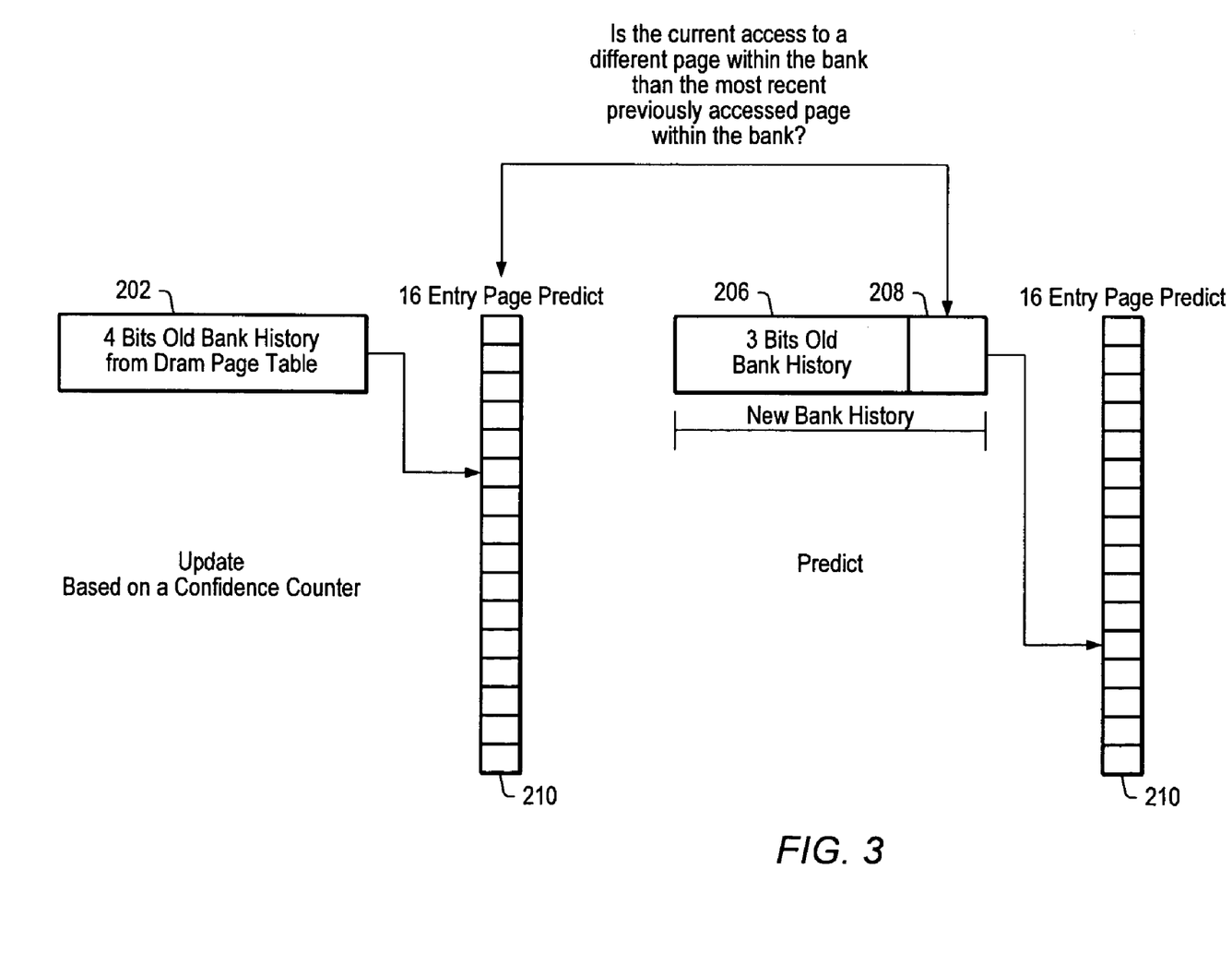
FIG. 3 is a structural diagram showing access and update of the Bank History Table according to one embodiment.

FIG. 3 shows one embodiment of how Bank History Table 108 is accessed and updated. In the embodiment shown, an entry into Bank History Table 108 may comprise an auto-precharge prediction bit (AP), which may have a value of '1' indicating that an auto-precharge is predicted, or a value of '0' indicating that an auto-precharge is not predicted. However, in alternate embodiments, the value of AP indicating an auto-precharge prediction may be specified to be different from that shown, so long as it is clear what the specified value is supposed to indicate. As shown in FIG. 3, Bank History Table 108 may contain 16 entries (210) corresponding to respective 4-bit indexes, with each index formed based on the bank history corresponding to the four most recent page accesses/requests for a given bank. In other words, the index for accessing a prediction entry for the currently requested page may be based on the last three accesses to the currently requested bank (i.e. bank history information stored in DRAM Page Table 106), plus the current request.

Prediction for a given page may be performed after arbiter 112 has selected the current request, and may include accessing a corresponding prediction value in Bank History Table 108 using an index value as described above. As shown in FIG. 3, the three bits (206) corresponding to the history of the most recent previous three accesses to the currently requested bank, plus the current request (208) may be used to form the index to access a prediction value in Bank History Table 108 for the currently requested page. IS It may be desired to perform the access to the prediction value in one clock cycle in order to prevent delaying page hits by an extra clock cycle.

In one set of embodiments, the index may be generated by multiplexing the chip select signal(s)/bank select signal(s) and page hit signal, and multiplexing the bank history from Page Table 106. It should be noted at this point that in alternate embodiments the number of entries may be different as determined at least by the number of most recent requests/accesses that are being tracked, and those skilled in the art will appreciate that the possible variations are not limited to the embodiment presented in FIG. 3. For example, if the five most recent accesses/requests to a bank were tracked, then Bank History Table 108 may be configured with 32 entries accessible based on a 5-bit index comprising 4 bits of old bank history plus the current (new) bank history. In all, the number of most recent accesses that are tracked may be specified to be different than 4, and many embodiments are possible in which the number of tracked most recent accesses is either less or more than 4.

Bank History Table 108 may subsequently be updated during the clock cycle following the prediction. As shown in FIG. 3, following the prediction, Bank History Table 108 may be updated by updating the entry (AP) value corresponding to the index defined by the 4-bit bank history obtained from DRAM Page Table 106, i.e. the four bits (202) corresponding to the history of the most recent previous four accesses to the currently requested bank. If the current request results in a page hit, the AP may be updated to '0' (in some embodiments, subject also to a confidence counter that will be described in more detail below). If the current request results in a page conflict, AP may be updated to '1' (again, subject to the confidence counter in some embodiments). If the current request results in a page miss, AP may be updated to '0' if the currently requested row is the most recently accessed/requested row in the requested bank, otherwise AP may be updated to '1' (once more, subject to the confidence counter in some embodiments). Once Bank History Table 108 has been updated, the bank history entry corresponding to the currently requested bank in Page Table 106 may also be updated to reflect the new bank history, which now includes the currently occurring or completed memory access.

As noted above, in one set of embodiments, the updating of the prediction value AP in Bank History Table 108 may be performed based additionally on a confidence counter. Each entry in Bank History Table 108 may also comprise a corresponding N-bit confidence counter value. The counter may increment if the prediction for its corresponding bank was correct, saturating at the value determined by the number of bits. E.g., if each entry in Bank History Table 108 had a corresponding 2-bit confidence counter, the counter may saturate at 3. The counter may decrement if the prediction was incorrect. The prediction value (i.e. the corresponding value of AP in Bank History Table 108) may be flipped when the counter reaches zero, indicating a string of incorrect predictions. Those skilled in the art will appreciate that the counter value may comprise any number of bits as specified, and that the actual numbers used herein are merely exemplary.

Auto-Precharge Prediction Algorithm:

Tracking the bank history as described above may be used as part of an auto-precharge prediction algorithm executed by DRAM controller 103, which may include three levels of prediction.

Level One: future requests in DCQ 114 may be used to determine whether a DRAM page that has most recently been accessed in a given bank should be immediately closed following the access, or if it should be left open. That is, the state of whether other pending requests in DCQ 114 are targeted toward a particular DRAM bank may be used to perform a level one auto-precharge prediction. Thus, each pending request in DCQ 114 may be evaluated to determine what given bank the request is for, and if the request is to the currently opened page in the given bank. In one set of embodiments, this evaluation may be made for the open page (and its corresponding given bank) that is being accessed for the currently processed memory request. That is, each pending request may be evaluated to determine if it is a request to the bank and/or page that is being accessed, to determine whether the currently processed memory request is to be sent to the DRAM memory with auto-precharge enabled or disabled. The action(s) taken in response to the evaluation of the pending requests in DCQ 114 may fall into one of the four following categories.

(A) If none of the pending requests in DCQ 114 are to pages within the given bank (i.e. none of the pending requests is requesting a page within the given bank and would thus not result in either a page hit or a page conflict for the open page in the given bank), then a level two prediction may be made according to the bank history information as described in the Bank History section above (see also Level Two entry further below), and the auto-precharge for the currently processed memory request may be set accordingly.

(B) If none of the pending requests in DCQ 114 are to the open page in the given bank, but at least one pending request is to a closed page in the given bank (i.e. none of the pending requests to the given bank would result in a page hit for the open page in the given bank, but at least one of the pending requests would result in a page conflict), then an auto-precharge may be enabled for the currently processed memory request (in order to close the open page in the given bank following the current memory access) regardless of what the corresponding prediction in Bank History Table 108 may be.

(C) If all the pending requests in DCQ 114 to the given bank are to the open page in the given bank (i.e. all of the pending requests to the given bank would result in a page hit for the open page in the given bank), then the open page in the given bank may be left open, i.e. auto-precharge would not be performed following the current memory access.

(D) If at least one of the pending requests in DCQ 114 to the given bank is to the open page in the given bank, and at least one of the pending requests is to a closed page in the given bank (i.e. at least one of the pending requests to the given bank would result in a page hit for the open page in the given bank, and at least one of those pending requests would result in a page conflict), then the open page in the given bank may be left open, i.e. auto-precharge would not be performed following the current memory access. The pending requests that would result in a page hit may be sent out first from DCQ 114, leading to the condition described in (B) above, once all those requests have been sent out.

Overall, conditions (C) and (D) may be combined to determine that if at least one of the pending requests in DCQ 114 is to the open page in the given bank, then auto-precharge for the current memory request (to the given bank) should be disabled.

Level Two: if no pending requests in DCQ 114 are to a DRAM page within the given bank (as described under Level One (A) above), recent bank history information may be used to predict whether the DRAM page should be immediately closed following the access, or whether it should be left open. The predictions may be accessed in Bank History Table 108 as previously described under Bank History.

Level Three: if a DRAM page has not been closed based on either a Level One or a Level Two prediction, the DRAM page may be left open, but it may be closed after having remained idle for a specified (programmable) number of clock cycles from the time it was last accessed.

It should be noted again that the bank history in DRAM Page Table 106, the prediction value in Bank History Table 108, and the corresponding confidence counter value may not be updated for requests whose auto-precharge decision was determined by a level One prediction as described under level One (A) above. Similarly, prefetches and write requests may not result in a prediction made using Bank History Table 108, or in an update of Bank History Table 108. Whether an auto-precharge is performed in conjunction with these types of requests may be also be determined by a level One prediction as described under level One (A) above. However, DRAM controller 103 may be configured to always initiate an auto-precharge subsequent to the last write request in a burst write, and prefetch and write requests may influence page hit/page conflict like any other request.

As discussed above, an auto-precharge prediction algorithm may be used to predict whether an auto-precharge should be performed for a read/write request. If the prediction does not result in an auto-precharge for the read/write request, the question may still remain when the open page should be closed. If the page remains open but idle for a long period of time, there is a chance that the bank history prediction may have been incorrect, which may lead to a page conflict. DRAM controller 103 may thus be configured to include a respective idle cycle counter corresponding to each DRAM Page Table entry to track how long a given page has been opened. In one set of embodiments, is DRAM controller 103 may operate to close the open (idle) page when the idle cycle counter corresponding to the open page hits a specified limit. In one embodiment, the specified limit may be programmable. Thus, DRAM controller 103 may close an inactive (idle) page after a specified number of clock cycles (e.g. 128 cycles in one embodiment), or it may close an inactive page after a dynamically adjusted specified number of clock cycles (e.g. 16, 32, 64, 96, etc. cycles), where the dynamic adjustment(s) may be based on the bank history entry corresponding to the specified memory page in DRAM Page Table history 106.

Figure 4:
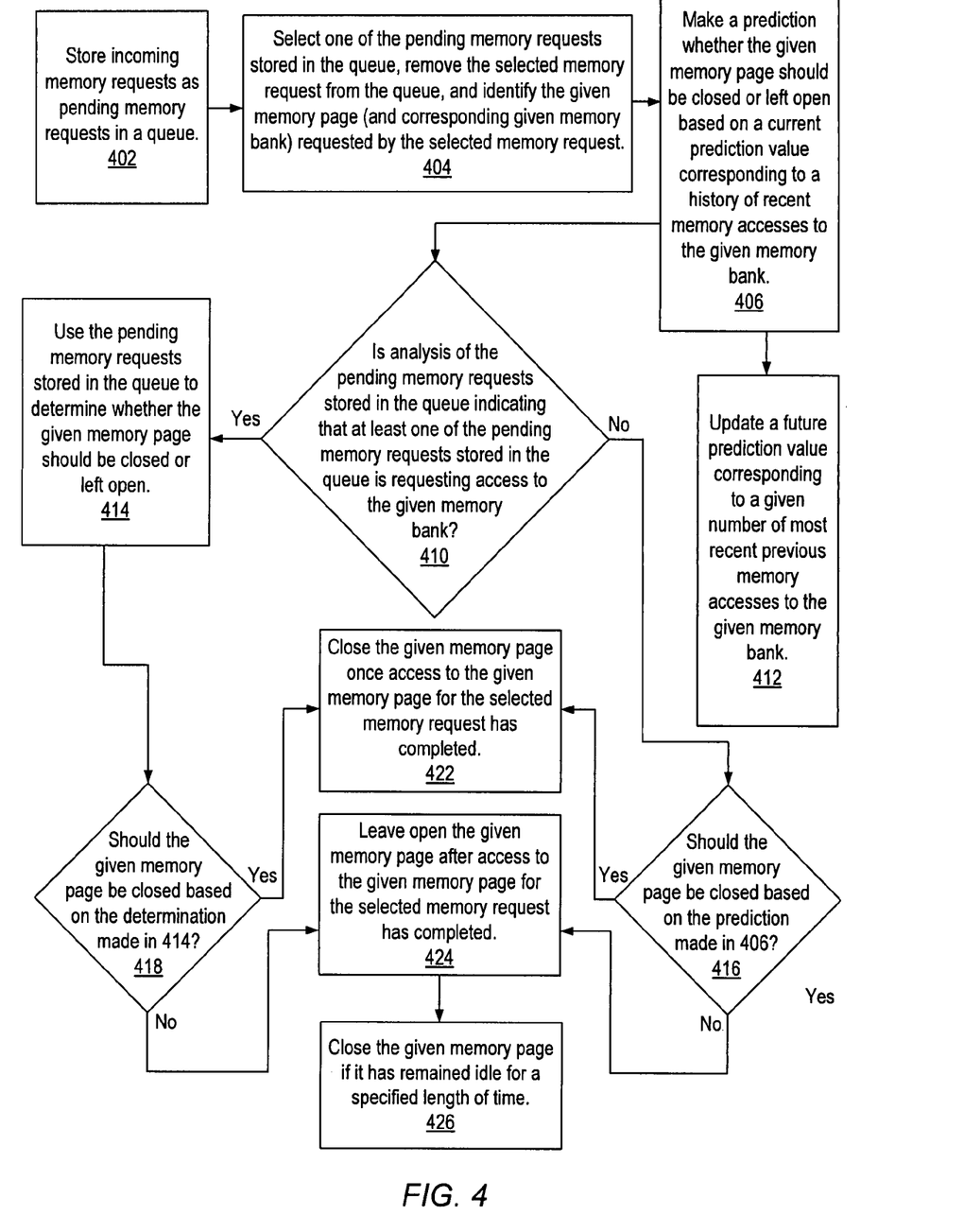
FIG. 4 is a flow diagram illustrating one embodiment of part of a three-level auto-precharge prediction algorithm.

FIG. 4 shows a flow diagram of one embodiment of one part of a three-level auto-precharge prediction algorithm that may be executed by a memory controller, e.g. memory controller 103 in FIGS. 1 and 2. Incoming memory requests, (which may be memory requests received by the memory controller), may be stored in a queue as pending memory requests (402). One of the pending memory requests stored in the queue may be selected for processing/servicing, and removed from the queue, and the given memory page (and corresponding given memory bank) requested by the selected memory request may be identified (404). A prediction may then be made whether to close or leave open the given memory page based on a current prediction value corresponding to a recent access history to the given memory bank (406). Once the prediction has been made, a future prediction value corresponding to a given number of most recent previous memory accesses to the given memory bank may be updated (412). The pending memory requests in the memory queue may be analyzed to determine whether at least one of the pending memory requests stored in the queue is requesting access to the given memory bank (410).

If the analysis in 410 indicates that at least one of the pending memory requests stored in the queue is requesting access to the given memory bank (i.e. at least one of the pending memory requests stored in the queue is targeting a memory page in the given memory bank), the pending memory requests stored in the queue may be used to determine whether the given memory page should be closed or left open (414, 418). If, on the other hand, the analysis in 410 indicates that none of the pending memory requests stored in the queue are requesting access to the given memory bank, the given memory page may be closed or left open according to the prediction made in 406 (416).

If either one of 418 or 416 indicates that the given memory page should be closed, the given memory page may be closed once access to the given memory page for the selected memory request has completed (and, in some embodiments, before the memory is accessed again) (422). If it was determined that the given memory page should remain open, it may be left open after access to the given memory page for the selected memory request has completed (424), and may subsequently be closed after a specified length of time, if during that specified length of time the given memory page has remained idle (426). The specified length of time may be measured in terms of clock cycles, and may be programmed. For example, the given memory page may be closed after it has remained idle for 128 clock cycles. In certain embodiments, the number of clock cycles may be dynamically adjusted based on the recent access history to the given memory bank. For example, based on the recent access history to the given memory bank, the 128 clock cycles may be adjusted to 16, 32, 64, etc. clock cycles. In some embodiments, the algorithm may further include updating the recent access history for the given memory bank, and updating a corresponding prediction value for the recent access history for the given memory bank, once the prediction in 406 has been made.

It should be noted here that the flow diagram in FIG. 4 does not specify when actual access to the given memory page by the selected (thus current) memory access takes place. In one set of embodiments, the access to the given memory page may take place after the determination regarding future accesses to the given memory page has been made. In another set of embodiments, the access may take place while the determination is being made, or even before the determination is made. However, the determination is made for what the status of the given memory page should be once access to the given memory page for the selected memory request has completed (and in certain embodiments, before the memory is accessed by another memory request). Thus, in some embodiments, once the determination regarding future accesses to the given memory page has been made, the selected memory request (command) may be forwarded to the memory (to access the given memory page) along with the auto-precharge indicator enabled for the selected memory command. The auto-precharge indicator may be enabled if it was predicted that the given memory page should be closed, and it may be disabled if it was predicted that the given memory page should be left open. An enabled auto-precharge may result in an automatic precharge of the row corresponding to the given memory page in the given bank, once access to the given memory page for the selected memory request has completed. A disabled auto-precharge indicator may result in an unchanged state of the row corresponding to the given memory page in the given bank following completion of the access to the given memory page for the selected memory request.

A DRAM controller may therefore be configured to re-order read/write requests in a way that maximizes the number of page hits and minimizes the number of page conflicts, where the re-ordering may be informed by auto-precharge predictions obtained through performing a three-level auto-precharge prediction algorithm to predict whether read/write requests should be followed by a precharge, in order to achieve optimum performance without having to track every individual page configured within the DRAM.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

We claim:

1. A method for managing access to a memory having a plurality of memory banks, the method comprising:
    identifying a given memory page requested by a current memory request, wherein the given memory page is in a given memory bank of the plurality of memory banks;
    determining whether the given memory page should be closed or left open based on a current prediction value corresponding to a history of recent memory accesses to the given memory bank; and
    once access to the given memory page for the current memory request has completed, performing one of:
        closing the given memory page in response to said determining resulting in a determination that the given memory page should be closed; or
        leaving open the given memory page in response to said determining resulting in a determination that the given memory page should be left open; and
    determining that none of one or more additional memory requests waiting to access the memory are requesting a memory page in the given memory bank;
    wherein said determining whether the given memory page should be closed or left open is performed in response to said determining that none of the one or more additional memory requests are requesting a memory page in the given memory bank.

2. The method of claim 1, wherein said performing one of is performed before the memory is accessed again after access to the given memory page for the current memory request has completed.

3. The method of claim 1, further comprising closing the given memory page a specified length of time after access to the given memory page for the current memory request has completed, in response to the given memory page having remained idle during the specified length of time.

4. The method of claim 1, further comprising obtaining the current prediction value according to:
    first information corresponding to a first number of most recent previous memory accesses to the given memory bank; and
    second information corresponding to the access to the given memory page for the current memory request.

5. The method of claim 4, wherein the first information is indicative of how many of the first number of most recent previous memory accesses to the given memory bank were made to the given memory page.

6. The method of claim 4, further comprising specifying a future prediction value subsequent to said obtaining the current prediction value, wherein said specifying the future prediction value is performed according to information corresponding to a second number of most recent previous memory accesses to the given memory bank.

7. The method of claim 6, wherein the second information is indicative of how many of the second number of most recent previous memory accesses to the given memory bank were made to the given memory page.

8. A memory controller configured to control access to a memory having one or more memory banks, the memory controller comprising:
    a page table configured to store respective memory bank access history information for each of the one or more memory banks; and
    a memory bank history table having a plurality of entries, wherein each entry of the plurality of entries is configured to store a respective prediction value corresponding to respective memory bank access history information stored in the page table for one of the one or more memory banks;
    wherein the memory controller is configured to identify a given memory page targeted by a current memory request, wherein the given memory page is in a given memory bank of the one or more memory banks;
    wherein the memory controller is further configured to obtain a current prediction value from the memory bank history table, wherein the current prediction value is based on at least the respective memory bank access history information stored in the page table for the given memory bank, and wherein the current prediction value indicates to the memory controller whether the memory controller should close the given memory page or leave open the given memory page; and wherein the memory controller is configured to determine whether any pending memory requests are targeting the given memory bank, and in response to determining that none of the pending memory requests are targeting the given memory bank, either close or leave open the given memory page according to what the current prediction value indicates, once access to the given memory page for the current memory request has completed; and wherein the pending memory requests comprise one or more additional memory requests waiting to access the memory.

9. The memory controller of claim 8, wherein the memory controller is configured to obtain the current prediction value from a given entry of the memory bank history table, wherein a location of the given entry is determined by:

at least a first portion of the respective memory bank access history information stored in the page table for the given memory bank; and memory bank access information corresponding to the current memory request.

10. The memory controller of claim 8, further comprising a queue configured to store the pending memory requests.

11. The memory controller of claim 10, wherein the memory controller is configured to forward the current memory request to the memory to access the given memory page for the current memory request.

12. The memory controller of claim 11, wherein the memory controller is configured to select a next memory request from the queue, remove the next memory request from the queue after forwarding the current memory request to the memory, and process the next memory request as the current memory request.

13. The memory controller of claim 12, wherein the memory controller is configured to select the next memory request according to a specified priority scheme.

14. The memory controller of claim 12, wherein the priority scheme comprises giving priority to memory requests stored in the queue that are requesting the given memory page.

15. The memory controller of claim 12, wherein the priority scheme comprises giving priority to memory requests stored in the queue that are requesting respective open memory pages in corresponding ones of the one or more memory banks.

16. The memory controller of claim 12, wherein the memory controller is configured to receive incoming memory requests and store the incoming memory requests in the queue as memory requests are removed from the queue.

17. The memory controller of claim 8, wherein when none of the pending memory requests are targeting the given memory page, and at least one of the pending memory requests is targeting a closed memory page in the given memory bank, the memory controller is configured to close the given memory page once access to the given memory page for the current memory request has completed.

18. The memory controller of claim 8, wherein when none of the pending memory requests are targeting any closed memory pages in the given memory bank, and at least one of the pending memory requests is targeting the given memory page, the memory controller is configured to leave open the given memory page once access to the given memory page for the current memory request has completed.

19. The memory controller of claim 8, wherein when at least one of the pending memory requests is targeting the given memory page, and at least one of the pending memory requests is targeting a closed memory page in the given memory bank, the memory controller is configured to leave open the given memory page once access to the given memory page for the current memory request has completed.

20. The memory controller of claim 8, wherein the memory controller is configured to update a future prediction value stored in the memory bank history table after obtaining the current prediction value.

21. The memory controller of claim 20, wherein the memory controller is configured to update the future prediction value stored in a given entry of the memory bank history table, wherein a location of the given entry is determined by the respective memory bank access history information stored in the page table for the given memory bank.

22. The memory controller of claim 21, wherein the respective memory bank access history information stored in the page table for the given memory bank comprises information indicating which memory pages were accessed in the given memory bank during a specified number of most recent previous memory accesses to the given memory bank.

23. The memory controller of claim 20, wherein the memory controller is configured to identify a memory access condition corresponding to the current memory request, wherein the memory access condition is one of:

a page hit indicating that the given memory page is already open;

a page miss indicating that there are no open pages in the given memory bank; or a page conflict indicating that the given memory page is not open and another memory page is open in the given memory bank;

wherein the memory controller is configured to update the future prediction value according to the memory access condition.

24. The memory controller of claim 23;

wherein when the memory access condition is a page hit, the memory controller is configured to update the future prediction value to indicate that the given memory page should remain open;

wherein when the memory access condition is a page conflict, the memory controller is configured to update the future prediction value to indicate that the given memory page should be closed;

wherein when the memory access condition is a page miss, and a most recently opened page in the given memory bank is not the given memory page, the memory controller is configured to update the future prediction value to indicate that the given memory page should be closed; and wherein when the memory access condition is a page miss, and a most recently opened page in the given memory bank is the given memory page, the memory controller is configured to update the future prediction value to indicate that the given memory page should remain open.

25. The memory controller of claim 23, wherein each entry of the memory bank history table is further configured to store a respective confidence counter value;

wherein the memory controller is configured to store the future prediction value in a given entry of the memory bank history table; and wherein the memory controller is configured to update the future prediction value according to the memory access condition, and the respective confidence counter value stored in the given entry.

26. The memory controller of claim 25, wherein the memory controller is configured to update the future prediction value when the confidence counter value is a specified value.

27. The memory controller of claim 26, wherein the specified value is zero.

28. The memory controller of claim 26, wherein the memory controller is configured to:
increment the respective confidence counter value when:
the current prediction value indicates that the given memory page should be closed and the memory controller closes the given memory page once access to the given memory page for the current memory request has completed; or
the current prediction value indicates that the given memory page should be left open and the memory controller leaves open the given memory page once access to the given memory page for the current memory request has completed; and
decrement the respective confidence counter value when:
the current prediction value indicates that the given memory page should be closed and the memory controller leaves open the given memory page once access to the given memory page for the current memory request has completed; or
the current prediction value indicates that the given memory page should be left open and the memory controller closes the given memory page once access to the given memory page for the current memory request has completed.

29. The memory controller of claim 28,
wherein the memory controller is configured to stop incrementing the respective confidence counter value once the respective confidence counter value has reached a specified maximum value; and
wherein the specified value is zero.

30. A method for managing access to a memory having a plurality of memory banks, the method comprising:
receiving a plurality of memory requests and storing the received memory requests in a queue as pending memory requests;
selecting one of the pending memory requests stored in the queue, and removing the selected memory, request from the queue;
identifying a given memory page and corresponding given memory bank requested by the selected memory request;
making a prediction whether the given memory page should be closed or left open based on a current prediction value corresponding to a history of recent memory accesses to the given memory bank;
determining that none of the pending memory requests stored in the queue are requesting access to the given memory bank;
in response to said determining, performing one of:
enabling auto-precharge for the selected memory request in response to said making a prediction resulting in the prediction that the given memory page should be closed; and
disabling the auto-precharge for the selected memory request in response to said making a prediction resulting in the prediction that the given memory page should be left open.

* * * * *